Nov. 4, 1952     C. J. STAHL     2,616,754
KNOCKED-DOWN TRUCK BODY

Filed Sept. 24, 1949                                   2 SHEETS—SHEET 1

INVENTOR.
CARL J. STAHL
BY
Bosworth & Sessions

Nov. 4, 1952  C. J. STAHL  2,616,754

KNOCKED-DOWN TRUCK BODY

Filed Sept. 24, 1949  2 SHEETS—SHEET 2

INVENTOR.
CARL J. STAHL
BY
Bosworth & Sessions

Patented Nov. 4, 1952

2,616,754

UNITED STATES PATENT OFFICE 2,616,754

KNOCKED-DOWN TRUCK BODY

Carl J. Stahl, Lakewood, Ohio, assignor to Stahl Metal Products, Inc., Cleveland, Ohio, a corporation of Ohio Application September 24, 1949, Serial No. 117,550

1 Claim. (Cl. 296—27)

This invention relates to truck bodies and more particularly to bodies for light service trucks.

Many truck chassis are sold by truck manufacturers without bodies, the user purchasing his own body to meet his own specific requirements. Heretofore the bodies for light service trucks, such as the one-half ton trucks which are used extensively by electricians, plumbers, radio and television repairmen, utility repairmen and the like, have ordinarily been built as units and either mounted on the chassis at the plant of the body manufacturer or the completely assembled bodies are shipped to the user who installs them on his own truck chassis. The first method of installation at the plant of the body manufacturer requires transportation of the truck chassis to the body manufacturer's plant and then to the user and thus involves delay and additional expense. The second method involves expensive shipment of the bulky assembled truck body to the customer and then requires that the body be mounted on the chassis by the user. In either event the bodies have generally been welded together into integral structures before assembly, making replacement of damaged parts difficult and expensive.

According to the present invention, the above noted difficulties are eliminated by the provision of truck bodies which are constructed of sub-assemblies arranged so that they can be packed in compact form for shipment to the user and then assembled and mounted on the user's truck chassis by any ordinary garage mechanic in a minimum of time without requiring special tools or equipment.

It is therefore an object of my invention to provide a truck body that may be quickly assembled and secured to the truck with a minimum of assembly operations and which can be done with unskilled labor and ordinary shop tools. A further object is to provide a truck body that can be shipped in knocked-down form to the ultimate user for mounting on the truck at his plant, thereby effecting a great saving in shipping costs. Another object is to provide a truck body, each section of which is readily replaceable as a unit in event of damage through accident.

Figure 1:
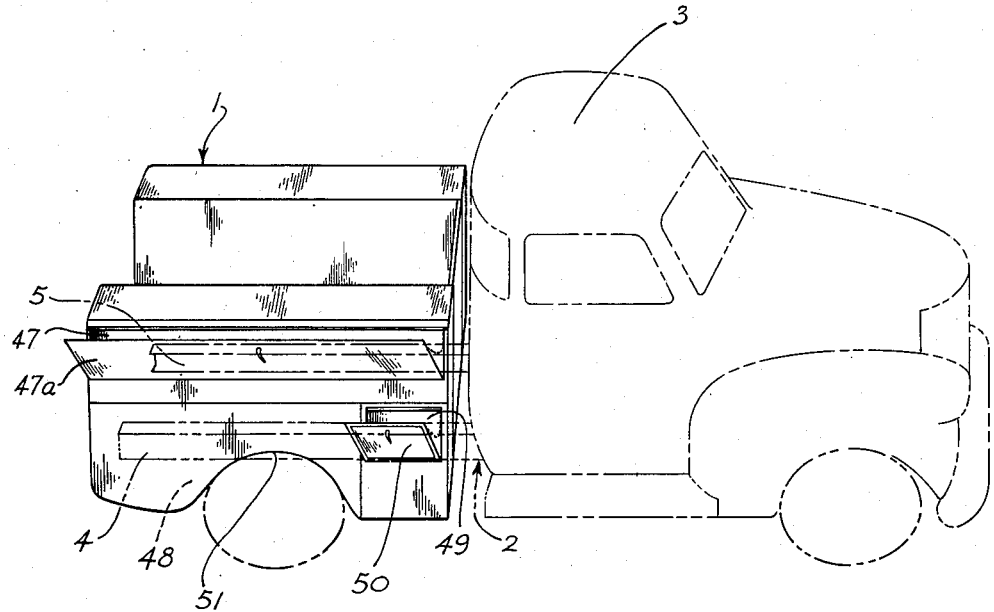
Figure 2:
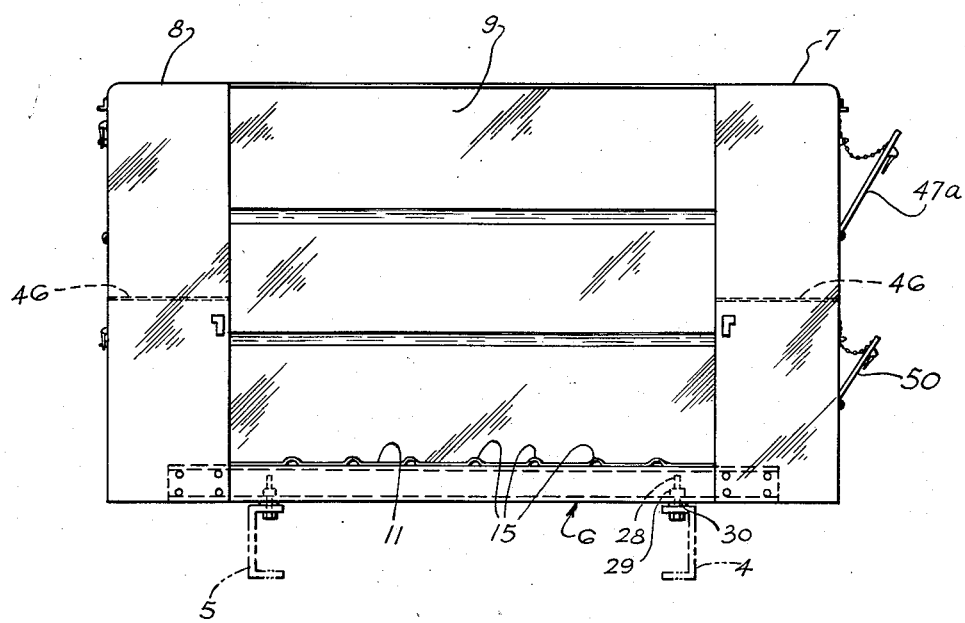
Figure 3:
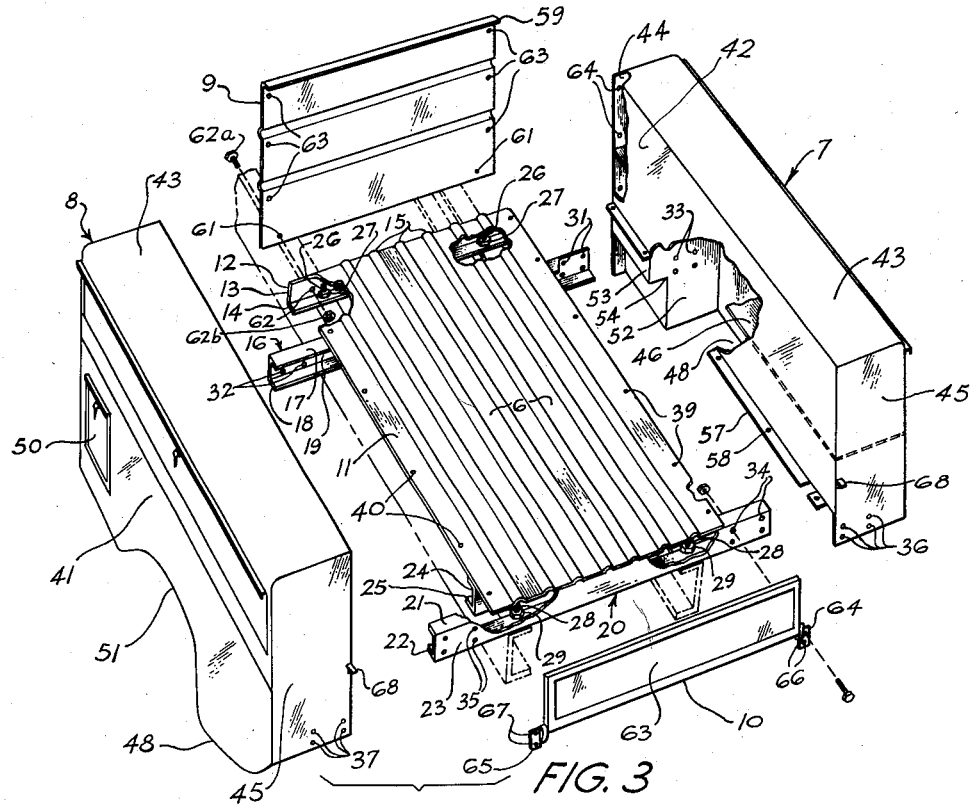

Further objects and advantages of my invention will appear from the following description of a preferred form thereof, reference being had to the accompanying drawings in which Figure 1 is a perspective view showing a truck body embodying the invention assembled and mounted on a standard, light truck chassis, the truck being shown in phantom lines; Figure 2 is a rear view of the assembled body with the tail gate removed and the chassis member to which the body is bolted shown in phantom lines; Figure 3 is an exploded perspective view of the body showing in phantom lines the chassis member to which the body is bolted; and Figure 4 is a perspective view of the body in knocked-down form ready for shipment.

Referring now to Figure 1, my improved truck body is indicated in general at 1 and is shown mounted on a conventional or standard one-half ton truck chassis 2 behind the cab 3. The truck chassis has the usual pair of channel-section longitudinally extending frame members 4 and 5, the body 1 being removably secured to and supported by the portions of the members that extend to the rear of the cab 3.

Figure 4:
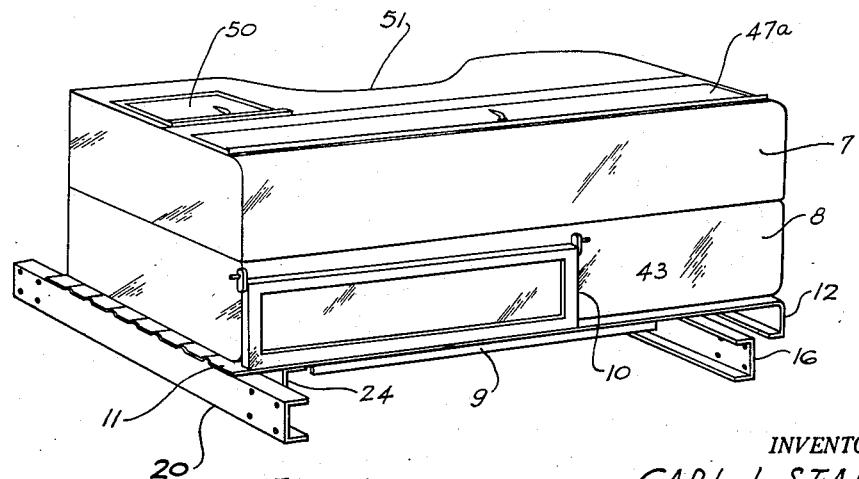

In order to provide for ease of assembly, compact packing for shipment and ready replacement of damaged parts, a knocked-down truck body embodying the present invention preferably comprises five main components or sub-assemblies; as shown in Figures 3 and 4, these are a floor member 6, a right side compartment member 7, a left side compartment member 8, an end panel member or wall 9 and a tail gate 10. These five components are adapted to be rigidly yet detachably fastened together by means to be described below. In addition, the floor member 6, and through it the assembled body, is arranged to be securely yet removably mounted on the truck chassis.

The floor unit 6 forms the bottom of the truck body and comprises a load supporting floor plate 11, the front end of which is bent downwardly to form a front channel portion 12 having a web portion 13 and a bottom flange 14 which rests upon the frame members 4 and 5 and is adapted to be bolted thereto. The plate 11 has longitudinally extending corrugations 15 formed therein to increase the rigidity of the floor and also to facilitate the loading and unloading of materials carried in the truck.

In order to secure the side compartments 7 and 8 to the floor, the floor unit 6 is provided with a transversely extending front channel 16 having a top flange 17, a bottom flange 18 and a web portion 19, and a transversely extending rear channel 20 having a top flange 21, a bottom flange 22 and a web portion 23. Channels 16 and 20 are secured to the under side of the floor plate 11 by their respective top flanges 17 and 21 in any suitable manner such as by welding, and project beyond the sides of the floor plate to support the respective right and left side compartment members 7 and 8. Rear channel 20 is also adapted to be bolted to the chassis frame members 4 and 5.

An auxiliary rear channel 24 is secured to the under side of the floor plate 11 in front of the rear channel 20 by any suitable means such as welding. Channel 24 has a bottom flange 25 which is adapted to be bolted to the frame members 4 and 5 and is provided as an alternate means for securing the rear of the body to the chassis so that the body may be used on truck chassis of varying lengths. Thus, if the distance from the back of the truck cab 3 to the rear ends of the frame members 4 and 5 is less than the overall length of the body, the auxiliary channel 24 is used to secure the rear portion of the body to the frame members. However, if the length of members 4 and 5 to the rear of the cab is sufficiently great, rear channel 20 is used to fasten the body to the frame members as illustrated in Figure 3.

The front of the body is provided by the end panel 9 which is disposed a few inches to the rear of the truck cab. When the body is assembled, panel 9 is secured to the front channel member 12 and to both side compartments 7 and 8, thus providing a strong and rigid assembly. The rear of the body is completed by the tail gate assembly 10 which is fastened to the side compartments 7 and 8.

The components of my improved truck body are designed to fit together tightly and securely when assembled for mounting on the truck chassis, with portions of each component overlapping portions of adjacent components. In order to secure the body components together and the assembled body to the truck chassis, I prefer to use high tensile strength cap screws and lock nuts. Thus, the assembled body is secured to the chassis by cap screws 26 and lock nuts 27 and cap screws 28 and lock nuts 29 engaging the front channel portion 12 and rear channel 20, respectively, of the floor unit. The channels are provided with holes (not visible in the drawings) in their respective bottom flange portions 14 and 22 which are aligned with holes in frame members 4 and 5. Preferably the holes in the frame members and channels are drilled in proper positions as the first step in mounting the body on the truck chassis. In order substantially to eliminate rattles and squeaks in the connections between the chassis and the body, felt washers or pads 30 (see Figure 2) are preferably disposed on the shank of the front and rear chassis screws 26 and 28 between the bottom flanges 14 and 22 of the front and rear channels 12 and 20, respectively, and the upper flange of the frame members 4 and 5. These pads prevent metal-to-metal contact between the frame members and the channels and substantially prevent undesirable noises which otherwise would result from the vibrations and jolts normally encountered in operation of the truck.

As mentioned above, auxiliary channel 24 may be used to tie down the rear portion of floor plate 11 to the frame members 4 and 5 if the body supporting portions of the truck chassis is shorter than the overall length of the body. In this case, the bottom flange 25 of the auxiliary channel 24 is drilled in alignment with the holes drilled in the top flanges of channel members 4 and 5 to receive rear chassis screws 28. If the auxiliary channel is so used, the bottom flange 22 of rear channel 20 is not provided with screw holes.

The front channel 16 and rear channel 20 extend transversely of the floor plate 11 beyond each side thereof to support the right and left compartment members 7 and 8. The compartment members are preferably secured to the channels by cap screws and lock nuts, the screws extending through sets of drilled holes 31 and 32 in the web portion 19 of the front transverse channel 16 near each end thereof and through registering holes in the compartments 7 and 8. Only the holes 33 in the right compartment member are shown in the drawing, these register with the holes 31 when the compartments are in the proper assembled relation with the floor unit 6; similar holes registering with the holes 32 are provided in compartment 8. Rear channel 20 is likewise provided with sets of holes 34 and 35 disposed in the web portion 23, and compartments 7 and 8 have holes 36 and 37, respectively, in their rear end walls 45 which match those in the rear channel when the side members are in proper assembled relation with the floor unit so that screws and lock nuts can be used to secure these parts together. The floor plate 11 also has a series of screw holes 39 and 40 disposed along its right and left edges, respectively, to provide an additional means for securing the side compartment members 7 and 8 thereto, as will be explained below.

The right and left compartments 7 and 8 of my truck body are preferably identical except that they are of opposite hand. Therefore, in the subsequent description like numbers indicate like parts on each of the compartments. Each compartment is elongated and hollow with a portion of its under side open, and is formed from sheet steel into a unitary structure. Each compartment has a longitudinally extending outer wall 41, a longitudinally extending inner wall 42, a top wall 43 and front and rear end walls 44 and 45, respectively. The end walls are substantially vertical, extend transversely between the inner and outer walls and are joined thereto as by welding to form a strong and rigid box-like structure. Horizontal center walls 46, welded to the inner and outer walls, divide the compartments into upper and lower sections, the former constituting an elongated tool-carrying compartment 47 (see Figure 1), access to which is provided by means of a hinged door 47a extending the full length of the side member. The lower sections of the compartments are each divided into a rear wheel housing portion 48 and a lower tool compartment 49 located in the forward portion of the side member. Access to the tool compartments 49 is provided by means of hinged doors 50 connected to the outer walls 41 of the side member. The outer walls 41 adjacent the wheel housing 48 are cut away as indicated at 51 to provide access to the rear wheels of the truck as for changing tires. The lower tool compartments 49 are separated from the wheel housings 48 by vertically extending intermediate transversely extending walls 52, in which the holes 33 are located, and are enclosed on their inner sides by inner walls 53 which are recessed as at 54. Walls 52 are preferably welded to the inner and outer walls and the horizontal walls 46, and are detachably secured to the ends of channel 16.

The inner walls 42 of the side members are provided with inwardly extending flanges 57 which are adapted to overlie the side edges of the floor plate 11 when assembled therewith. Flanges 57 have a series of drilled holes 58 which register with holes 39 and 40 in plate 11 when the side members are assembled therewith. As before, screws and lock nuts are used to fasten the flanges to the floor unit.

The end member 9, which is preferably corrugated as shown and provided with a rearwardly extending upper flange 59, is secured to the channel portion 12 of the floor and to the front end walls 44 of both compartments 7 and 8. Again, cap screws and lock nuts are preferably employed for this purpose. The lower portion of the end member 9 is provided with holes 61 which register with holes 62 in the web 13 of the channel portion 12 so that the end member may be secured to the channel by cap screws 62a and lock nuts 62b.

Holes 63 along the vertical edges of the end member 9 register with holes 64 spaced along the vertical inner edges of the front walls 44 of the compartments 7 and 8 to provide for securing these members together by cap screws and lock nuts. Thus, the end member 9 functions to brace the side compartments and thus to make the body into a rigid and strong structure.

Preferably the operations of assembling the body and mounting it on a truck chassis are carried out in the following order: First, the holes for screws 26 and 28 are drilled in the proper positions in the chassis frame members 4 and 5 and in the channel members 12 and 20. Then the side compartments are bolted to the transverse floor channels 16 and 20 and the flanges 57 bolted to the floor plate 11. The next step is to secure the front end member 9 to the front walls of the side compartments 7 and 8 and to the web 13 of the front channel portion 12. The tail gate hinges are next mounted on the rear walls of the side compartments and the tail gate assembly installed. Finally the assembled body is placed on the chassis, the previously drilled holes are lined up and the body is bolted down onto the chassis with the anti-squeak pads 30 interposed between the frame members and the transverse channels of the body.

From the foregoing description it will be apparent that the components of my truck body can be assembled by the ultimate user into a sturdy, rigid body without requiring any particular skill or any special tools. Because the assembly operations are easy, my truck body may advantageously be sold and shipped in knocked-down form. As shown in Figure 4, the components are designed so that they can be assembled into a compact package which can be crated readily and shipped at much lower cost than the bulky assembled body. Thus, in knocked-down form for shipment, the floor unit 6, which has an overall length and width at least substantially as great as the length and height of the side compartments 7 and 8, forms support for the side compartments; the end panel 9 is disposed beneath the floor plate 11 and the tail gate assembly 10 rests alongside the top wall 43 of the side member 8. The parts so assembled may be enclosed in a conventional rectangular shipping crate and can be shipped direct to the user at much less cost than an assembled body and with little likelihood of damage during shipment.

A further advantage of the knocked-down construction in which the component parts are secured together by screws and nuts is found in the fact that any component can be removed and replaced readily in the event that it is damaged in an accident. This feature results in substantial savings to truck owners since it is frequently easier and cheaper to replace a damaged component than it would be to repair it as is required in truck bodies which are permanently assembled as by welding.

Although a preferred form of truck body embodying the present invention is described in detail in the foregoing specification, it will be understood that those skilled in the art may change or modify the illustrated embodiments without departing from the spirit of my invention. The scope of the invention is defined by the appended claim.

I claim:

A knocked-down service truck body adapted to be shipped in knocked-down form and to be assembled and mounted on a truck chassis having longitudinally extending frame members, said body comprising a floor member, right and left side hollow compartment members and an end panel member, said floor member having a floor portion, a downwardly turned front channel portion for mating with said frame members and said end panel member, the mating parts of said frame members, end panel member and channel portion having openings therein for receiving removable means for securing same together, front and rear transverse channel members welded to the under side of said floor portion and projecting beyond the sides thereof, both said side compartment members having inner and outer laterally spaced longitudinally extending walls, and vertical front, rear and intermediate walls extending between said longitudinally extending walls and welded thereto to provide a rigid structure, said vertical front walls and said end panel member having mating parts provided with openings for receiving removable means for securing same together, said vertical intermediate walls and the projecting portions of said front transverse channel member having mating parts, and said vertical rear wall and the projecting portion of said rear transverse channel member likewise having mating parts, the mating parts of said intermediate and rear walls and said projecting portions of the channel members having openings that register to receive removable securing means when the parts are in assembled position, the overall width and length dimensions of said floor member being at least substantially as great as the overall length and height dimensions of said side compartment members, whereby said floor member can act as a supporting base for said side compartment members when said body is crated for shipment in knocked-down form.

CARL J. STAHL.

REFERENCES CITED

The following references are of record in the file of this patent:

UNITED STATES PATENTS

| Number | Name | Date |
| --- | --- | --- |
| D. 132,712 | Troche et al. | June 9, 1942 |
| 1,223,912 | Waterman | Apr. 24, 1917 |
| 2,263,298 | Weber | Apr. 16, 1918 |
| 2,380,557 | Terry | July 31, 1945 |
| 2,382,376 | Black | Aug. 14, 1945 |
| 2,461,577 | Stark, Jr. | Feb. 15, 1949 |
| 2,471,917 | Wilson | May 31, 1949 |
| 2,502,093 | Johnson | Mar. 28, 1950 |
| 2,504,222 | Otto | Apr. 18, 1950 |